United States Patent
Martin et al.

(10) Patent No.: US 9,176,001 B2
(45) Date of Patent: Nov. 3, 2015

(54) VIBRATION TREATMENT METHOD AND GRAPHICAL USER INTERFACE

(75) Inventors: Thomas B. Martin, Shelby Township, MI (US); Thomas E. Hebel, Canton, MI (US); August G. Hebel, III, Shelby Township, MI (US)

(73) Assignee: Bonal Technologies, Inc., Royal Oak, MI (US)

( * ) Notice: Subject to any disclaimer, the term of this patent is extended or adjusted under 35 U.S.C. 154(b) by 1312 days.

(21) Appl. No.: 13/019,076

(22) Filed: Feb. 1, 2011

(65) Prior Publication Data

US 2012/0198376 A1 Aug. 2, 2012

(51) Int. Cl.
| | |
|---|---|
| G06F 7/00 | (2006.01) |
| B23K 31/02 | (2006.01) |
| C21D 10/00 | (2006.01) |
| G01H 1/00 | (2006.01) |
| C21D 9/50 | (2006.01) |

(52) U.S. Cl.
CPC .. *G01H 1/00* (2013.01); *C21D 9/50* (2013.01); *C21D 10/00* (2013.01)

(58) Field of Classification Search
CPC ................................ G06F 3/048; B23K 31/02
USPC ..................... 715/771, 768; 701/101; 348/65; 347/105; 359/463; 228/203
See application file for complete search history.

(56) References Cited

U.S. PATENT DOCUMENTS

| | | | |
|---|---|---|---|
| 3,736,448 A | | 5/1973 | Hebel, Jr. et al. |
| 3,741,820 A * | | 6/1973 | Hebel, Jr. et al. ............... 48/508 |
| 4,968,359 A | | 11/1990 | Hebel, Jr. et al. |
| 5,648,902 A * | | 7/1997 | Honda ......................... 701/33.4 |
| 5,918,226 A * | | 6/1999 | Tarumi et al. ......................... 1/1 |
| 6,339,685 B1 * | | 1/2002 | Okamoto et al. ............... 399/16 |
| 6,483,425 B1 * | | 11/2002 | Avenel ......................... 340/5.61 |
| 6,519,088 B1 * | | 2/2003 | Lipton ......................... 359/463 |
| 7,844,921 B2 * | | 11/2010 | Ike et al. ....................... 715/863 |
| 8,233,037 B2 * | | 7/2012 | Matsui ............................. 348/65 |
| 8,473,176 B2 * | | 6/2013 | Youngquist et al. .......... 701/101 |
| 8,594,883 B2 * | | 11/2013 | Gilbert ......................... 701/33.8 |
| 2003/0007004 A1 * | | 1/2003 | Kanungo et al. ............... 345/762 |
| 2003/0216889 A1 * | | 11/2003 | Marko et al. .................. 702/182 |
| 2005/0018031 A1 * | | 1/2005 | Brasier et al. ................. 347/105 |

(Continued)

FOREIGN PATENT DOCUMENTS

| | | |
|---|---|---|
| EP | 2 169 497 A1 | 3/2010 |
| JP | 2003 302283 A | 10/2003 |

OTHER PUBLICATIONS

"Ultrosonic Imaging of Internal Vibration of Soft Tissue under Forced Vibration", Yoshik, et. al, IEEE Transaction of Ultrasonics, Ferroelctronics, and Frequency Control, vol. 37, No. 2, Mar. 1990.*

(Continued)

*Primary Examiner* — Jennifer To
*Assistant Examiner* — Jasmine Wan
(74) *Attorney, Agent, or Firm* — Reising Ethington PC

(57) ABSTRACT

A graphical user interface for vibration treatment includes control buttons hidden for display of certain screens, and/or a vibration amplitude meter that includes at least one peak amplitude bar and a present amplitude bar extending alongside the at least one peak amplitude bar and graphically coded for an in-range condition and at least one out-of-range condition. Related methods, computer program products, and systems are also disclosed.

18 Claims, 8 Drawing Sheets

(56) References Cited

U.S. PATENT DOCUMENTS

| | | | |
|---|---|---|---|
| 2006/0283920 A1* | 12/2006 | Chitty | 228/203 |
| 2007/0176933 A1* | 8/2007 | Culpi et al. | 345/440.2 |
| 2008/0183664 A1* | 7/2008 | Cancel et al. | 707/2 |
| 2009/0061960 A1* | 3/2009 | Chang et al. | 455/575.3 |
| 2010/0011309 A1* | 1/2010 | Mitra et al. | 715/768 |

OTHER PUBLICATIONS

A. George Hebel III, "Vibrational Conditioning of Metals", Heat Treating Progress Forecast, Heat Treating Progress, Jan./Feb. 2004, 1 page.

Meta-Lax Stress Relief & Weld Conditioning—Model 2700, Bonal Technologies Inc., 1300 North Campbell Road, Royal Oak, Michigan 48067, www.bonal.com, © 2001, 2 pages.

Meta-Lax Stress Relief & Weld Conditioning System—Series 1701, Bonal Technologies Inc., 1300 North Campbell Road, Royal Oak, Michigan 48067, www.bonal.com, © 1997, 2 pages.

Meta-Lax Stress Relief & Weld Conditioning Equipment—2000, Bonal Technologies Inc., 1300 N. Campbell Road, Royal Oak, Michigan 48067, www.bonal.com, © 2010, 2 pages.

Meta-Lax Stress Relief & Weld Conditioning System—Series 701, Bonal Technologies Inc., 1300 North Campbell Road, Royal Oak, Michigan 48067, www.bonal.com, © 1997, 2 pages.

Shaker Control User Guide—Version 8.0, LDS—A Member of the Bruel & Kjaer Group, Jan. 1, 2009, pp. i-x and 72-431.

Meta-Lax Equipment Guide for Stress Relief, Bonal Technologies, Inc., Jul. 12, 2010, 2 Pages.

Meta-Lax 2700 Specification Sheet, Bonal Technologies, Inc., May 1, 2001, 2 pages.

Meta-Lax Model 2400 webpage, Bonal Technologies, Inc., Feb. 25, 2010, 1 page.

Meta-Lax 2400 Operation Demonstration, Bonal Technologies, Inc., Feb. 25, 2010, 15 pages.

Meta-Lax Series 2400 Specification Sheet, Bonal Technologies, Inc., Feb. 25, 2010, 2 pages.

International Search Report and Written Opinion of the International Searching Authority, International Application No. PCT/US2012/023472, International Filing Date: Feb. 1, 2012, Date of Mailing: Sep. 6, 2012, 13 pages.

* cited by examiner

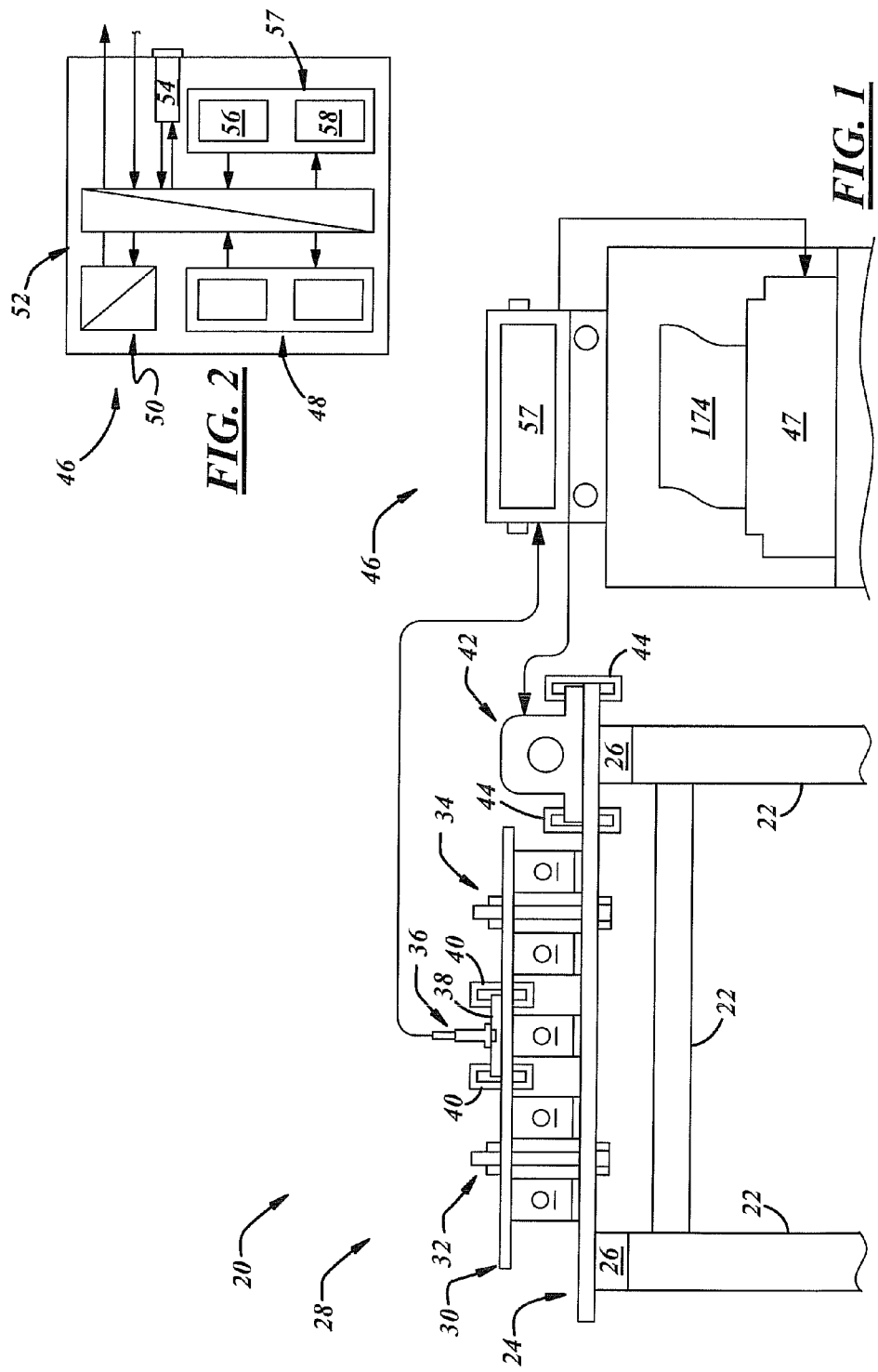

VIBRATION TREATMENT METHOD AND GRAPHICAL USER INTERFACE

The present disclosure is directed to vibration treatment like stress relief and weld conditioning and, more specifically, to related methods and graphical user interfaces.

BACKGROUND AND SUMMARY OF THE DISCLOSURE

Equipment for vibration stress relieving and weld conditioning typically includes a vibrator for coupling to a product to be stress relieved or weld conditioned, a vibration transducer for coupling to the product to monitor vibration induced by the vibrator, a controller coupled to the vibrator and vibration transducer to monitor and control vibration of the product, and a user interface to allow a user to interact with the controller. U.S. patents that illustrate equipment and related methods of this type include U.S. Pat. Nos. 3,741,820 and 4,968,359.

A general object of the present disclosure, in accordance with one aspect of the disclosure, is to provide a vibration treatment method and a graphical user interface that facilitate improved interaction of a user with a controller and a more intuitive understanding of the method steps.

The present disclosure embodies a number of aspects that can be implemented separately from or in combination with each other.

A graphical user interface for vibration treatment equipment in accordance with one aspect of the disclosure includes a vibration amplitude meter. The meter includes an origin, a range limit oppositely disposed from the origin, at least one peak amplitude bar representative of a peak amplitude signal and extending from the origin toward the range limit, and a present amplitude bar representative of a present amplitude signal and extending from the origin toward the range limit alongside the at least one peak amplitude bar, wherein the present amplitude bar is graphically coded for an in-range condition and at least one out-of-range condition.

In accordance with another aspect of the disclosure, there is provided a method of vibration treatment of an object including a) providing to a user, a graphical user interface including a vibration amplitude meter and a vibration frequency control, b) receiving a first scan request from the user via the vibration frequency control, c) applying increasing amounts of mechanical vibration to the object in response to receipt of the first scan request, d) monitoring frequency and amplitude of the vibration applied to the object in step c), and e) storing a first frequency corresponding to maximum amplitude from the first scan. The method also includes f) displaying to the user via the vibration amplitude meter of the graphical user interface, an amplitude origin, a range limit oppositely disposed from the origin, at least one peak amplitude bar representative of a peak amplitude signal and extending from the origin toward the range limit, and a present amplitude bar representative of a present amplitude signal and extending from the origin toward the range limit alongside the at least one peak amplitude bar, wherein the present amplitude bar is displayable in an in-range graphical code and in at least one out-of-range graphical code.

In accordance with a further aspect of the disclosure, there is provided a computer program product including computer-readable medium including instructions executable by a computer processor of a vibration treatment system to cause the vibration treatment system to implement steps of the method recited above.

In accordance with an additional aspect of the disclosure, there is provided a computer-controlled vibration treatment system, including at least one input device to receive data, at least one output device to present data, a memory storing program instructions and data, and a processor coupled to the input and output devices and memory and responsive to the program instructions for causing the computer-controlled system to perform the method recited above.

In accordance with yet another aspect of the disclosure, there is provided a graphical user interface for vibration treatment equipment, wherein the interface includes an amplitude section including a graphical vibration amplitude meter and a numerical vibration amplitude meter, and a frequency section including a numerical vibration frequency meter and a plurality of graphical vibration frequency control buttons. The interface also includes a timer section including a numerical chronometer, and a job section including a plurality of graphical job control buttons, wherein all of the control buttons are displayed in a default screen and at least one of the control buttons becomes hidden in at least one other screen.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a schematic view of a vibration treatment system in accordance with an exemplary embodiment of the present disclosure;

FIG. 2 is a block diagram of a computing apparatus that may be used in conjunction with the system of FIG. 1, in accordance with an exemplary embodiment of the present disclosure;

DETAILED DESCRIPTION OF PREFERRED EMBODIMENTS

Figure 3:
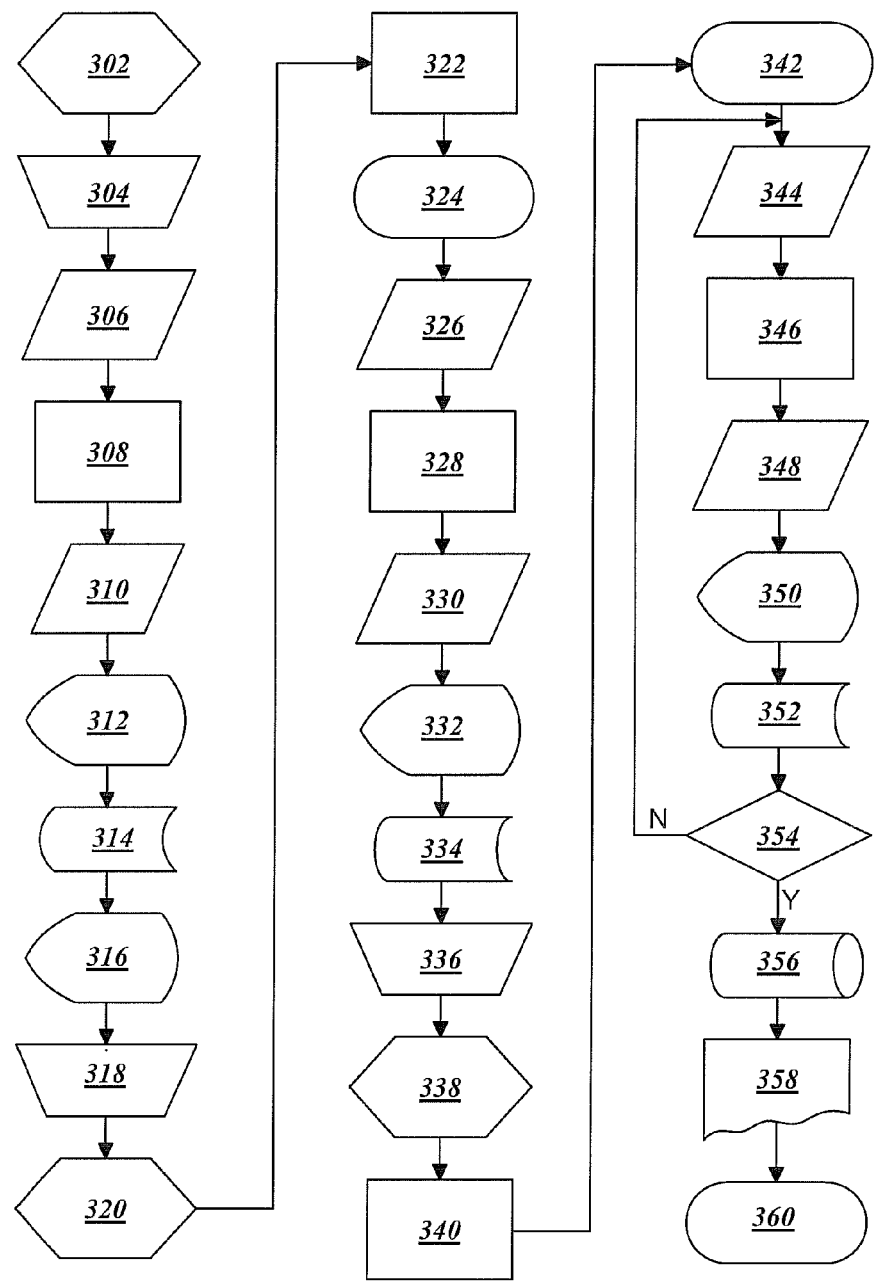
FIG. 3 is a flow chart of a vibration treatment method that may be used in conjunction with the system of FIG. 1 and the apparatus of FIG. 2, in accordance with an exemplary embodiment of the present disclosure.
Figure 4:
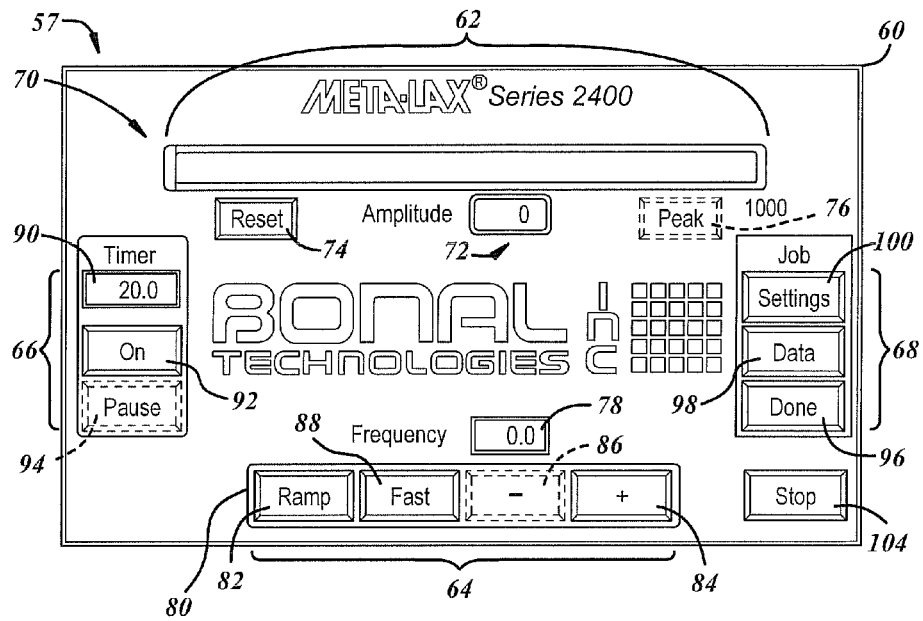
FIG. 4 is an illustration of a default screen of a graphical user interface that may be used in conjunction with the system and apparatus of FIGS. 1 and 2 and the method of FIG. 3, in accordance with an exemplary embodiment of the present disclosure.

FIG. 1 illustrates a vibration treatment system 20 for vibration treating one or more objects O, for example to relieve residual stress in the object(s) O. The system 20 may be similar to that disclosed in U.S. Pat. Nos. 3,741,820 and 4,968,359, which are assigned to the assignee hereof and incorporated herein by reference, except for features of the present disclosure which will be described in detail below. The objects O may be any products suitable for vibration treatment, and the system 20 may include any suitable configuration and not just the illustrated example configuration described below.

In the example configuration illustrated in FIG. 1, the system 20 may include a table 22, a plate 24 supported by the table 22 and on which the objects O are supported, and vibration isolators 26 disposed between the table 22 and the plate 24. The system 20 also may include a restraint 28 to restrain the objects O and which may include a clamping plate 30 and suitable couplers 32, 34 for example, clamps, or fasteners as shown. The system 20 additionally may include a force transducer 36 that may be threaded or coupled in any other suitable manner to an adapter plate 38 which may be coupled to the plate 24, for example, by transducer clamps 40 or in any other suitable manner. The system 20 further may include a vibrator or force inducer 42 that may be coupled to the plate 24, for example, by inducer clamps 44 or in any other suitable manner. Finally, the system 20 may include a computing apparatus 46 to receive input from a user, monitor input from the force transducer 36, control output to the force inducer 42, and transmit output to the user, for example, via a printer 47 or the like.

In general operation, the system 20 is computer-controlled and the user interacts with the computing apparatus 46 to operate the force inducer 42, which induces vibration to the plate 24, objects O, restraint 28, and the like. In turn, the force transducer 36 senses vibration of the objects O and communicates vibration parameter signals back to the computing apparatus 46, which communicates vibration data and information back to the user.

The computing apparatus 46 maybe used to carry out various aspects of the presently disclosed method. In one example, the computing apparatus 46 may receive input data and instructions from the user, process the received input in light of stored software and/or data, and transmit suitable output to the force inducer 42, printer 47, or any other suitable equipment or device. Conversely, in another example, the computing apparatus 46 may receive input from the force transducer 36, or any other suitable equipment or device, and then process the received input in light of stored data and software, and transmit output to the user, the printer 47, or any other suitable equipment or device. The computing apparatus 46 may include, for example, an electrical circuit, an electronic circuit or chip, and/or a computer. The computing apparatus 46 may be integrated with any suitable input and/or output devices or may be separate therefrom.

In the computer embodiment, and referring now to FIG. 2, the computing apparatus 46 generally may include memory 48, one or more processors 50 coupled to the memory 48, one or more interfaces 52, 54, one or more input devices 56, and/or one or more output devices 58. Of course, the computing apparatus 46 further may include any ancillary devices, for example, clocks, internal power supplies, and the like (not shown). Although not shown, the computing apparatus 46 may be supplied with electricity by an AC-to-DC converter, one or more batteries, and/or any other suitable power supply device(s).

In the illustrated embodiment, the input devices 56 and output devices 58 are integrated in the form of a touch screen user interface device 57. However, those of ordinary skill in the art would recognize that the devices 56, 58 may be separate. In other embodiments, the input devices 56 may include peripheral input devices or user input devices, for example, a pointing device (e.g., a mouse, trackball, pen, touch pad, joystick, and the like), keyboard, microphone, camera, and/or the like. The input devices 56 may be used to enter any suitable commands, instructions, data, information, signals, and the like into the apparatus 46. In other embodiments, the output devices 58 may include user output devices, for example, audio speakers or earphones, or a monitor or any other type of display device, or may include peripheral output devices, for example, the printer 47, a modem or any other communication adapter, and/or the like. In any event, the devices 56, 58 may be used to receive or transmit any suitable user input or output, whether tactile, audible, and/or visual.

The interfaces 52, 54 may include internal and/or external communication interfaces and may include wired and/or wireless devices. For example, at least one of the interfaces 52 may include an internal bus, which may provide for data communication between the memory 48, processor(s) 50, and/or any other elements of the computing apparatus 46. In another example, at least one of the interfaces 54 may include an external bus for data communication between elements of the computing apparatus 46 and peripheral devices. The interfaces 52, 54 may include one or more of any of several types of bus structures, including a memory bus or memory controller, a peripheral bus, an accelerated graphics port, a local or processor bus, and using any of a variety of bus architectures. Also, the interfaces 52, 54 may include analog-to-digital or digital-to-analog converters, signal conditioners, amplifiers, filters, other electronic devices or software modules, and/or any other suitable interfaces. The interfaces 52, 54 may conform to, for example, RS-232, parallel, small computer system interface, universal serial bus, and/or any other suitable protocol(s). The interfaces 52, 54 may include circuits, software, firmware, and/or any other device to assist or enable the computing apparatus 46 in communicating internally and/or externally with other devices.

The processor(s) 50 may process data and execute instructions that provide at least some of the functionality for the system 20. As used herein, the term instructions may include, for example, control logic, computer software and/or firmware, programmable instructions, or other suitable instructions. The processor(s) 50 may include, for example, one or more microprocessors, microcontrollers, discrete logic circuits having logic gates for implementing logic functions on data signals, application specific integrated circuits with suitable logic gates, programmable or complex programmable logic devices, programmable or field programmable gate arrays, and/or any other suitable type of electronic processing device(s).

The memory 48 may include any computer readable medium or media configured to provide at least temporary storage of at least some data, data structures, an operating system, application programs, program modules or data, and/or other computer software or computer-readable instructions that provide at least some of the functionality of the system and that may be executed by the processor(s) 50. The data, instructions, and the like may be stored, for example, as look-up tables, formulas, algorithms, maps, models, and/or any other suitable format.

The memory 48 may be in the form of removable and/or non-removable, volatile memory and/or non-volatile memory. Exemplary volatile memory may include, for example, random access memory (RAM), static RAM (SRAM), dynamic RAM (DRAM) including synchronous or asynchronous DRAM, and/or the like, for running software and data on the processor. By way of example, and not limitation, the volatile memory may include an operating system, application programs, other memory modules, and data. Exemplary non-volatile memory may include, for example, read only memory (ROM), erasable programmable ROM (EPROM), electrically erasable programmable ROM (EEPROM), dynamic read/write memory like magnetic or optical disks or tapes, and static read/write memory like flash memory, for storing software and data. Although not separately shown, the computing apparatus 46 may also include other removable/non-removable volatile/non-volatile data storage or media. For example, the other media may include dynamic or static external storage read/write device(s).

The method or parts thereof may be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another. The computer readable medium may also include computer to computer connections, for example, when data is transferred or provided over a network or another communications connection (either wired, wireless, or a combination thereof).

From the above, it is to be understood that the method disclosed below maybe at least partially performed by any electronic article(s) and/or device(s) capable of executing instructions corresponding to one or more steps of the disclosed method. Those of ordinary skill in the art would recognize that the method steps described below may be implemented as one or more computer programs in any suitable programming language(s).

FIG. 3 illustrates an exemplary method 300 of vibration treatment of one or more objects, as discussed in detail below. Also, portions of the method 300 will be described in reference to the subject matter of FIGS. 1 and 2 described above, and with reference to the subject matter of FIGS. 4-16 described below. The method steps may or may not be sequentially processed, and the disclosed method encompasses any sequencing, overlap, or parallel processing of such steps.

At step 302, a graphical user interface may be provided to a user. For example, as shown in FIG. 1 or 2, the computing apparatus 46 may present a graphical user interface (GUI), for example via the input/output device 57, that displays output to and receives input from a user. In accordance with a default mode of the apparatus 46, and with reference to FIG. 4, the GUI may include a default screen 60 wherein all available graphical features like meters and control buttons are displayed. In general, the GUI default screen 60 may have an amplitude section 62, a frequency section 64, a timer section 66, and a job section 68, all of which may have one or more graphical meters or control buttons.

More specifically, the amplitude section 62 may include a graphical vibration amplitude meter 70, a numerical vibration amplitude meter 72, a reset button 74, and a peak button 76. The frequency section 64 may include a numerical vibration frequency meter 78 and a vibration frequency control 80 that may include a frequency ramp button 82, a frequency incremental increase button 84, a frequency incremental decrease button 86, and a fast/slow modifier button 88. The aforementioned buttons may be toggle style buttons wherein they may have touch-to-start and touch-again-to-stop type of functionality. The timer section 66 may include a numerical chronometer 90, and on/off button 92, and a timer pause button 94. The job section 68 may include a done button 96 to save job data and complete the process, a data button 98 to review job data, and a settings button 100 to review and enter job settings. In addition, the GUI default screen 60 also may include a stop button 104 to interrupt and stop the process. The various sections, meters, and buttons may be arranged vertically or horizontally and in the locations as shown, or in any other suitable arrangement(s) and in any other suitable location(s).

Also, as will be described below, at least one of the meters or buttons may become hidden in at least one mode other than the default screen mode. For example, in any given mode, all buttons not relevant to that mode may be hidden. Such hiding narrows the possible selections for a user, thereby reducing failure modes of the process.

Figure 5:
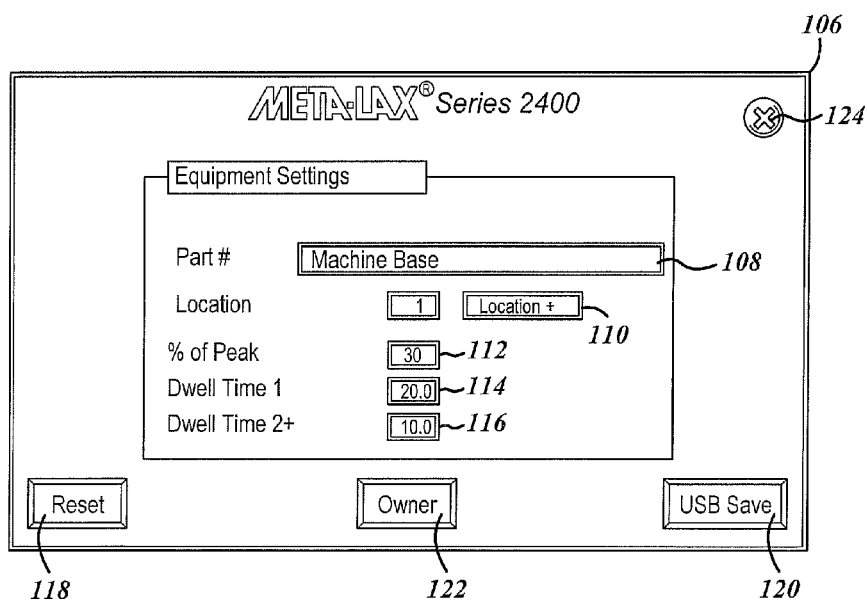
FIG. 5 is an illustration of a parameter settings screen of the graphical user interface.

At step 304, job settings may be received from a user. For example, the user may select the job settings button 100 shown in FIG. 4, which selection results in presentation of a graphical job settings screen 106 as shown in FIG. 5 in accordance with a job settings mode of the apparatus 46. The screen 106 shows a description field 108 for the objects being treated, and a location field 110 indicating an identifier for a location of the vibration transducer 36. The screen 106 also shows a peak percentage field 112, and first and subsequent vibration treatment time fields 114, 116, wherein a user may look up appropriate values for the objects being treated and enter the values in these fields. For example, a user may look up such values in one or more system manuals available from the present assignee, Bonal Technologies, Inc. of Royal Oak, Mich. The screen 106 further includes a reset button 118 to reset the internally stored data, an external memory save button 120 to save the data to external memory, and a user or owner button 122. Once the settings are entered, the user may select the owner button 122 to present another screen (not shown) where the user may enter a user's or owner's name, address, telephone number, language preference, time, and the like. Otherwise, the user may close out the job settings display by selecting a screen close icon 124 or by any other suitable manner.

At step 306, a first scan request may be received from the user. For example, with reference to FIG. 4, the user may access the vibration frequency control 80 and select the frequency ramp button 82 or increase button 84 at which time one or more of the buttons 92, 94, 96, 98, and 100 may become hidden.

At step 308, increasing amounts of mechanical vibration are applied to the object(s) in response to receipt of the first scan request of step 306. For example, in accordance with a vibration scan mode, the computing apparatus 46 may transmit output signals to the force inducer 42 to ramp up the speed of the force inducer 42 to ramp up vibration of the object(s) O.

At step 310, frequency and amplitude of the vibration applied to the object(s) O in step 308 are monitored. For example, the computing apparatus 46 may receive from the force transducer 36, input signals indicative of vibration amplitude and frequency of the object(s) O being vibrated.

Figure 6A:
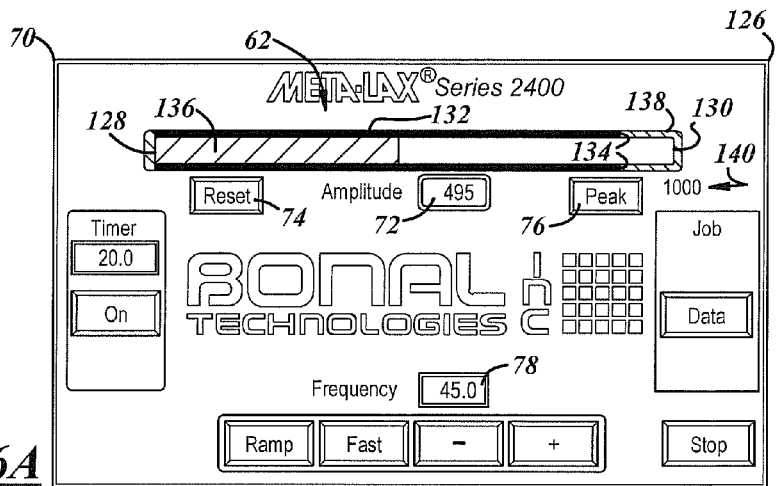
FIGS. 6A and 6B are illustrations of a scan mode screen of the graphical user interface.

At step 312, vibration amplitude and frequency information may be displayed to the user. For example, with reference to FIG. 6A, in accordance with a scan display mode of the apparatus 46, the GUI may include a scan progress screen 126 illustrating real-time frequency data in the frequency meter 78, and real-time amplitude information and data in the amplitude meters 70, 72. As shown in FIG. 6A, the timer set and job done and settings buttons 94, 96, 100 have been hidden.

As shown in FIG. 6A, the amplitude meter 70 may include an amplitude origin 128, a range limit 130 oppositely disposed from the origin 128, and at least one peak amplitude bar 132 representative of a peak amplitude signal from the transducer 36 and/or processor(s) 50 and extending from the origin 128 toward the range limit 130 and having ends 134 indicative of the peak amplitude. The meter 70 also includes a present amplitude bar 136 representative of a present amplitude signal from the transducer 36 and/or processor(s) 50 and extending from the origin 128 toward the range limit 130. The bars 132, 136 may extend alongside one another, as shown. Preferably, two peak amplitude bars 132 are disposed on either side of the present amplitude bar 136 between the ends of the bar 136 and possibly extending beyond the end thereof. As will be discussed in greater detail below, the present amplitude bar 136 may be graphically coded. Finally, the meter 70 further includes a border 138 that may surround the space provided for the amplitude bar 136 and that may be graphically coded according to a present amplitude limit 140. As shown, the peak amplitude bar(s) 132 may extend along and overlap portions of the sides of the border 138.

Figure 6B:
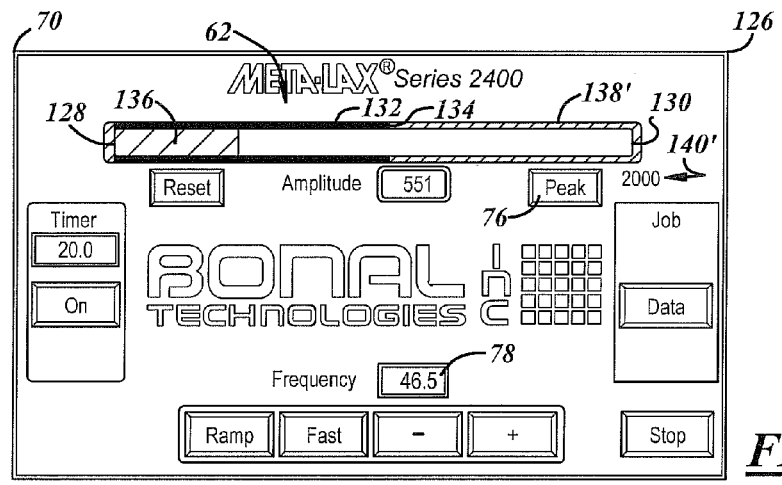

FIG. 6B depicts the scan progress screen 126 wherein the border 138' of the amplitude meter 70 automatically changes in graphic appearance to indicate a change in the amplitude range and limit 140'. In FIG. 6A, the amplitude range is 0-1000 and the border 138 has a first graphic appearance, whereas in FIG. 6B, the amplitude range has automatically changed from 0-1000 to 1000-2000 and the border 138' has automatically changed to a second graphical code in response to corresponding amplitude levels received from the transducer 36. The borders 138, 138' and the limits 140, 140' may be provided in any suitable quantity of different graphical codes and values. In one embodiment, the borders may be provided in four different colors (e.g. blue, green, yellow, and peach) corresponding to four different limits of 1000, 2000, 3000, and 4095. The amplitude measurements are unitless or non-dimensional, but may be proportional to $g_{rms}$ or RMS acceleration or the like.

Unlike the present amplitude bar 136, which advances and retracts in real-time accordance with the scan, the peak amplitude bars 132 advance and maintain position or length.

Therefore, once the user determines that the bars 132 no longer advance (because a peak amplitude of the scan has been reached), the user may advance the process by pressing the ramp button 82 shown in FIG. 6A or 6B to store or record the value corresponding to peak amplitude represented by the bars 132. In another embodiment, the user may select the peak button 76 to manually enter a peak amplitude value.

Figure 7:
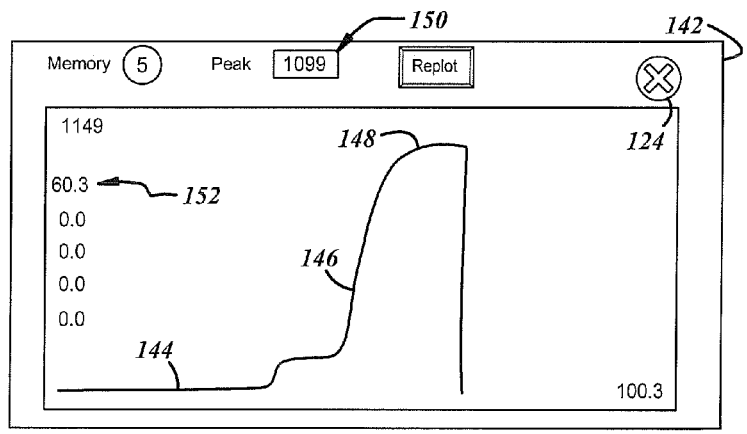
FIG. 7 is an illustration of graphical plot output from a first scan of a vibration scan mode of the apparatus of FIG. 2.

In another example of the scan display mode, and with reference to FIG. 7, the GUI also may include a scan results screen 142 illustrating a graphical plot of results from a first scan from the vibration scan mode of the apparatus 46. The screen 142 may include frequency along the horizontal axis and amplitude along the vertical axis, with maximum parameter value limits displayed at the extremes thereof. In this example, a plot 144 of the first scan includes a first harmonic 146 including a graphical peak amplitude 148 and a corresponding numerical peak amplitude 150, and a peak vibration frequency 152 corresponding to the peak amplitude 150. The user may return to the default screen 60, for example, by selecting the exit icon 124 or in any other suitable manner.

At step 314, the first frequency corresponding to the peak amplitude from the first scan may be stored. For example, the first frequency may be stored in the memory of the computing apparatus 46. The frequency values may be a percentage of the maximum frequency output of the force inducer 42. In other words, the frequency values are not necessarily in Hertz units.

Figure 8:
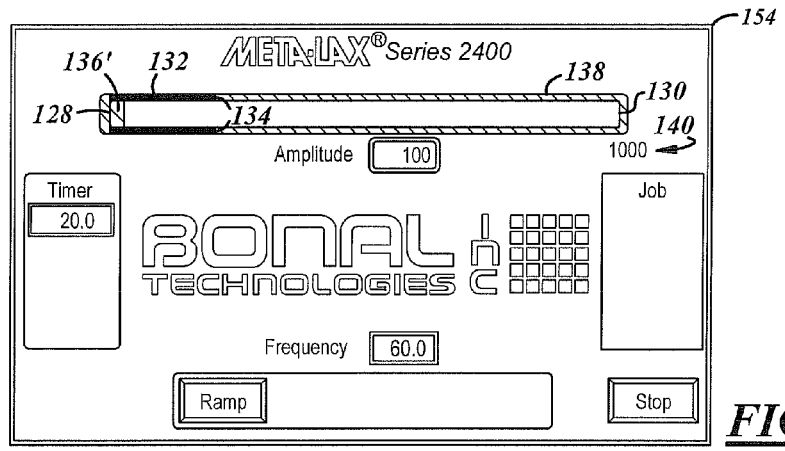
FIG. 8 is an illustration of a vibration treatment setting screen of the graphical user interface, wherein several graphical features visible in FIG. 4 have been hidden.

At step 316, various aspects of the vibration amplitude meter of the graphical user interface may be dynamically displayed to the user. Referring to FIG. 8, and in accordance with a vibration treatment ramping mode of the apparatus 46, the GUI may include a vibration treatment setting screen 154, wherein the peak button, reset, frequency speed modifier and increase/decrease buttons, timer button and job buttons have been hidden.

Figure 9:
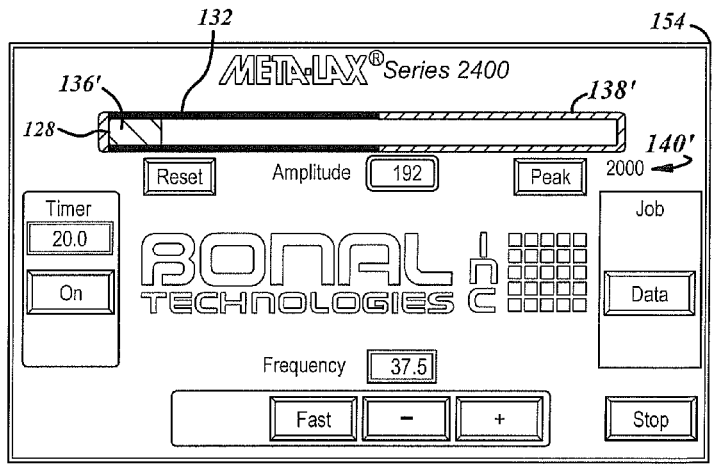
FIG. 9 is another illustration of the vibration treatment setting screen, depicting a below-range condition.
Figure 10:
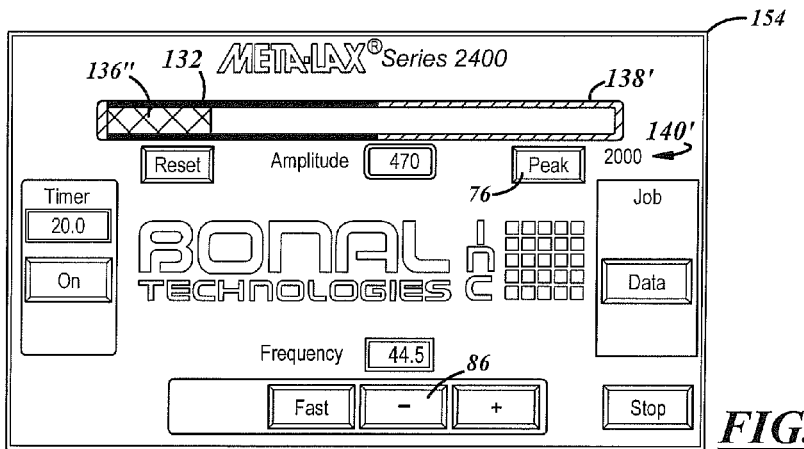
FIG. 10 is a further illustration of the vibration treatment setting screen, depicting an above-range condition.
Figure 11:
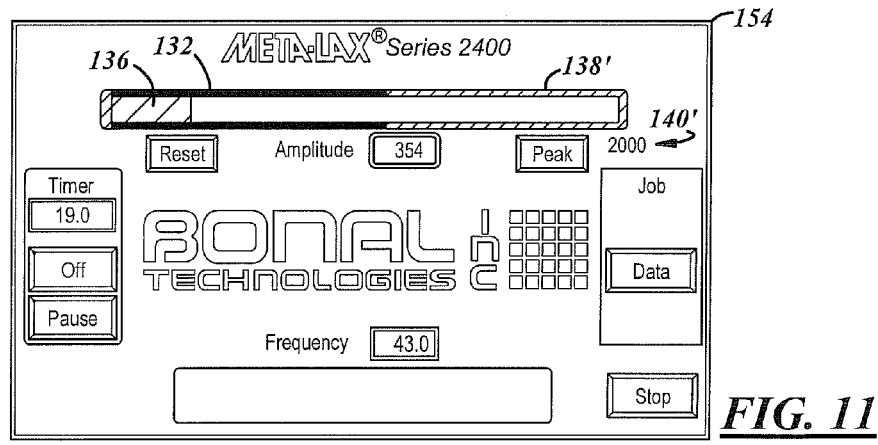
FIG. 11 is an additional illustration of the vibration treatment setting screen, depicting an in-range condition.

With reference to FIGS. 9 through 11, the present amplitude bar 136 is displayable in at least one out-of-range graphical code (136', 136"; FIGS. 9 and 10) and in an in-range graphical code (136; FIG. 11). The out-of-range graphical codes may include a below-range graphical code (FIG. 9) and an above-range graphical code (FIG. 10).

At step 318, a vibration setting may be received from the user to set the frequency of vibration applied to the object(s) O. For example, the user may select the frequency incremental increase button 84 to increase the amount of mechanical vibration applied to the object by the vibration inducer to an in-range sub-harmonic frequency. At least initially, the frequency incremental decrease button 86 is hidden because the operation starts at zero frequency and cannot go lower. Likewise, when the vibration inducer reaches its maximum frequency, the increase button 84 may become hidden. Both buttons 84, 86 may become hidden when the timer button 84 is engaged.

As shown in FIG. 9, once the frequency incremental increase button 84 has been selected, the screen 154 changes, wherein the present amplitude bar 136 has increased from the origin 128 toward the ends 134 of the peak amplitude bars 132 in the below-range condition illustrated by a below-range code of the bar 136'. The below-range code may be a color code, for example, blue, or may be a graphical pattern or design as shown, or any other suitable visual indication.

But as shown in FIG. 10, the present amplitude bar 136" may exceed the in-range condition to the above-range condition illustrated by the above-range code of the bar 136". The above-range code may be a color code, for example, red, or may be a graphical pattern or design as shown, or any other suitable visual indication. Therefore, the user may select the frequency decrease control button 86 to decrease the amount of mechanical vibration applied to the object(s) O by the vibration inducer 42. Accordingly, as shown in FIG. 11, the present amplitude bar 136 has decreased to the in-range condition, wherein the present amplitude bar 136 displays the in-range graphical code. For example, the in-range condition may be a sub-harmonic range, for instance, between 5% and 50% of the peak amplitude. More preferably, within range, sub-harmonic settings may be about 30% to about 40% of the peak amplitude for many materials. The in-range code may be a color code, for example, green, or may be a graphical pattern or design as shown, or any other suitable visual indication. Particular shades of blue, red, and green color codes have been selected to maximize differentiation for individuals who have color impaired vision.

The in-range position of the bar 136 may be determined by a tolerance band around the value set in the peak percentage field 112 in the settings screen 106 of FIG. 5. For example, the tolerance band may be plus or minus 5% or any other suitable value. Once the user is satisfied that the vibration frequency has been set to a level that yields a good in-range position of the amplitude bar 136, the user may toggle the frequency incremental increase/decrease buttons 84, 86.

Figure 12:
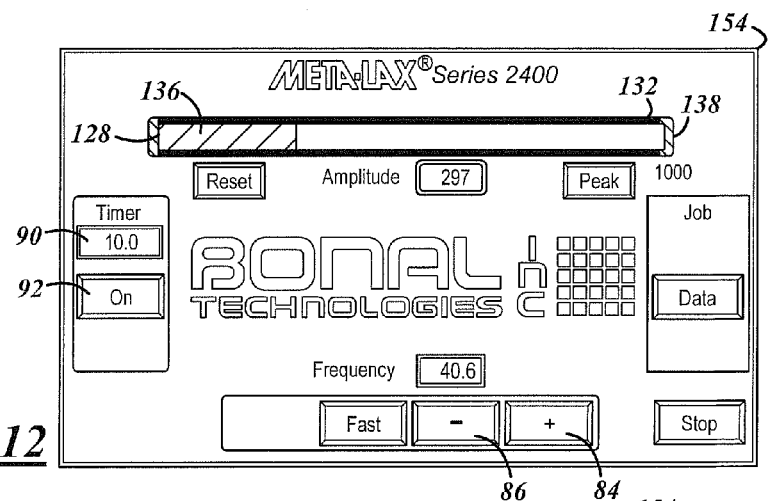
FIG. 12 is yet another illustration of the vibration treatment setting screen, depicting vibration frequency set within range, wherein a timer button has reappeared.

As shown in FIG. 12, after a predetermined delay after the user has toggled the buttons 84, 86, the screen 154 changes to allow the user to start the timer. For example, the timer on/off button 92 reappears.

At step 320, once the user is satisfied with the vibration level set in step 318, the user may start a first round of vibration treatment. For example, the user may select the timer on/off button 92 to start the timer. Thereafter, as shown in a vibration treatment screen 156 in FIG. 13, the chronometer 90 begins to decrement from the set first time toward zero. Also shown in FIG. 13, the amplitude and frequency control buttons are hidden, and the timer on/off button 92 displays the word "off" to indicate to the user that the button 92 has been toggled and may be selected to stop timer countdown. Also, the pause button 94 may have reappeared to allow a user to pause the process.

At step 322, a fixed amount of mechanical vibration may be applied to the object(s) O for the set first time. For example, step 322 may begin in response to receipt of the timer starting of step 320. The first time may be a value set in the first vibration treatment time field 114 of the settings screen 106 of FIG. 5 and as may automatically appear in the chronometer 90.

During step 322, and referring to FIGS. 9 through 11, the present amplitude bar 136 may continue to be displayed, and if the present amplitude signal changes such that the present amplitude bar 136 displays the out-of-range graphical code (136', 136"), the user may be allowed to adjust the mechanical vibration applied to the object(s) O via the vibration frequency control 80 until the present amplitude bar 136 again displays the in-range graphical code.

At step 324, application of the fixed amount of mechanical vibration is terminated upon expiration of the first time. At this time the GUI may display a data screen (not shown) to show the results of the fixed vibration treatment. Such results data may include the treatment time, peak amplitude, frequency at peak amplitude, the time of day, and the like. The user may exit the data results screen in any suitable manner to return to the default screen of FIG. 4.

At step 326, a second scan request is received from the user. For example, with reference to FIG. 4, the user may select the frequency ramp button 82 of the vibration frequency control 80.

At step 328, increasing amounts of mechanical vibration are applied to the object(s) O in response to receipt of the second scan request of step 326. For example, in accordance with a vibration scan mode, the computing apparatus 46 may transmit output signals to the force inducer 42 to ramp up the speed of the force inducer 42 to ramp up vibration of the object(s) O.

At step 330, frequency and amplitude of the vibration applied to the object in step 328 are monitored. For example, the computing apparatus 46 may receive from the force transducer 36 input signals indicative of vibration amplitude and frequency of the object(s) O being vibrated.

At step 332, vibration amplitude and frequency information may be displayed to the user. For example, with reference to FIG. 14, in accordance with the scan display mode of the apparatus, the GUI may include the scan results screen 142 illustrating a graphical plot of results from the second scan from the vibration scan mode of the apparatus 46. The graph is similar to that of FIG. 7 in that it includes the plot 144 from the first scan, but also includes a plot 158 of the second scan that includes a first harmonic 160 including a graphical peak amplitude 162 and the corresponding numerical peak amplitude 150, and a vibration frequency 164 corresponding to the peak amplitude 150. The second plot 158 appears greater in amplitude magnitude than the first plot 144, but the second plot 158 is merely shifted upward for the sake of clarity. The real difference between the plots 158, 144 is the shift leftward indicating the decrease in frequency at the peak amplitude 150. The user may return to the default screen 60, for example, by selecting the exit icon 124 or in any other suitable manner.

At step 334, a second frequency corresponding to maximum amplitude from the second scan is stored. For example, the second frequency may be stored in the memory 48 of the computing apparatus 46.

At step 336, a vibration setting may be received from the user to set the frequency of vibration applied to the object(s) O. This step is similar to that of step 318 discussed above.

Figure 13:
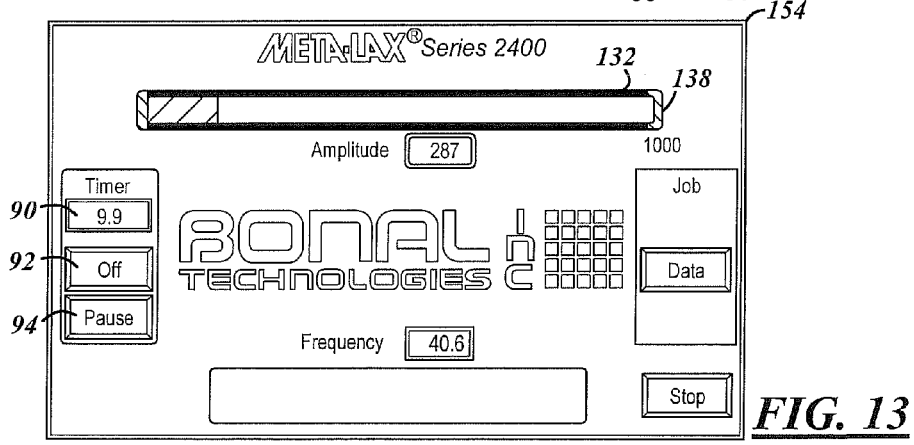
FIG. 13 is an illustration of a vibration treatment screen of the graphical user interface depicting countdown of the timer, wherein amplitude buttons and frequency control buttons have been hidden and the timer button has been toggled and a timer pause button has reappeared.
Figure 14:
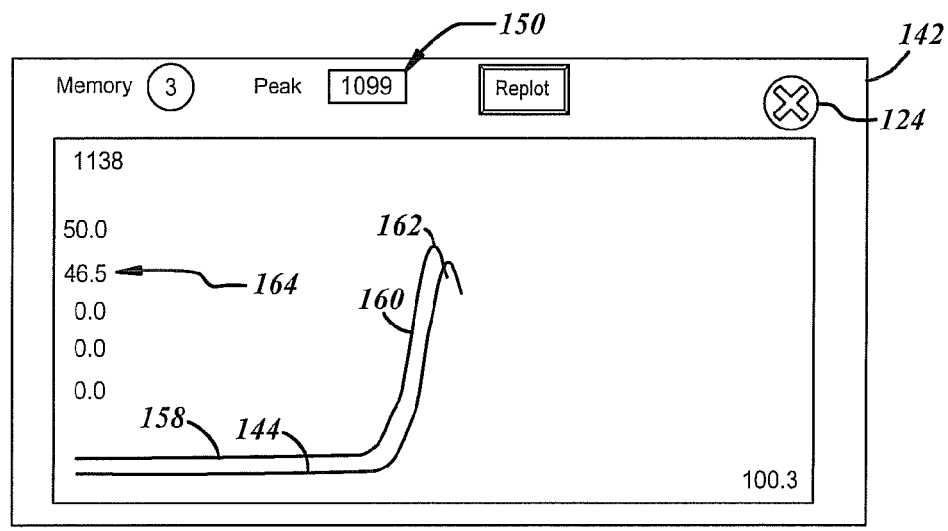
FIG. 14 is an illustration of graphical plot output from a second scan of the vibration scan mode of the apparatus of FIG. 2.
Figure 15:
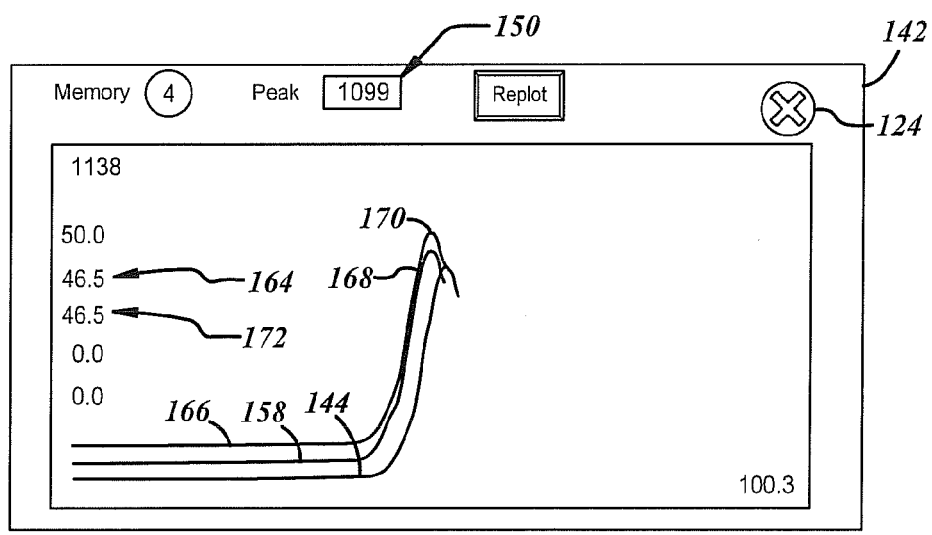
FIG. 15 is an illustration of graphical plot output from a subsequent scan of the vibration scan mode of the graphical user interface.

At step 338, once the user is satisfied with the vibration level set in step 336, the user may start a subsequent round of vibration treatment. For example, at the screen 154 of FIG. 12, the user may select the timer on/off control button 92 to start the timer. Thereafter, the chronometer 90 begins to decrement from the subsequent time toward zero, as shown in FIG. 13. The second time may be automatically populated to the chronometer 90 with a value set in the subsequent vibration treatment time field 116 from the settings screen 106 of FIG. 5.

At step 340, a fixed amount of mechanical vibration may be applied to the object(s) O for a subsequent time. For example, step 340 may begin in response to receipt of the timer starting of step 338.

During step 340, and referring to FIGS. 9 through 11, the present amplitude bar 136 may continue to be displayed, and if the present amplitude signal changes such that the present amplitude bar 136 displays the out-of-range graphical code, the user may be allowed to adjust the mechanical vibration applied to the object(s) O via the vibration frequency control 80 until the present amplitude bar again displays the in-range graphical code.

At step 342, application of the fixed amount of mechanical vibration may be terminated upon expiration of the subsequent time. Again, at this time, and although not shown, the GUI may display a data screen to show the results of the fixed vibration treatment. The results data may include the treatment time, peak amplitude, frequency at peak amplitude, the time of day, and the like. The user may exit the data results screen in any suitable manner to return to the default screen of FIG. 4.

At step 344, a subsequent scan request is received from the user via the vibration frequency control 80. For example, with reference to FIG. 4, the user may select the frequency ramp button 82.

At step 346, increasing amounts of mechanical vibration are applied to the object(s) O in response to receipt of the subsequent scan request of step 344. For example, in accordance with the vibration scan mode, the computing apparatus 46 may transmit output signals to the force inducer 42 to ramp up the speed of the force inducer 42 to ramp up vibration of the object(s) O.

At step 348, frequency and amplitude of the vibration applied to the object in step 346 are monitored. For example, the computing apparatus 46 may receive from the force transducer 36 input signals indicative of vibration amplitude and frequency of the object(s) O being vibrated.

At step 350, vibration amplitude and frequency information may be displayed to the user. For example, with reference to FIG. 15, in accordance with the scan display mode of the apparatus, the GUI may include the scan results screen 142 illustrating a graphical plot of results from the subsequent scan from the vibration scan mode of the apparatus 46. The graph is similar to that of FIG. 14 in that it includes the plots 144, 158 from the first and second scans, but also includes a plot 166 of the subsequent scan that includes a first harmonic 168 including a graphical peak amplitude 170 and the corresponding numerical peak amplitude 150, and a vibration frequency 172 corresponding to the peak amplitude. Again, the subsequent plot 166 appears greater in amplitude magnitude than the first and second plots 144, 158, but the subsequent plot 166 is merely shifted upward for the sake of clarity. In this case, there is little to no leftward shift of the subsequent plot 166 with respect to the second plot 158, and there is no change between the frequencies 164, 172 corresponding to the peak amplitude, which is the goal of the vibration treatment. The user may return to the default screen 60, for example, by selecting the exit icon 124 or in any other suitable manner.

At step 352, a subsequent frequency corresponding to maximum amplitude from the subsequent scan is stored. For example, the subsequent frequency may be stored in the memory 48 of the computing apparatus 46.

At step 354, vibration treatment may be determined to be complete, if a difference between the second and subsequent frequencies is less than a predetermined amount. The predetermined amount may be any suitable parameter, for example, a percentage, and according to any suitable tolerance amount, for example, plus or minus one percent. In the example shown in FIG. 15, there is no difference between the second and subsequent frequencies 164, 172; they are identical. Therefore, vibration treatment would be determined to be complete. However, if the difference between the second and subsequent frequencies 164, 172 was greater, or not less than, the predetermined amount, then the process would loop back to step 344.

At step 356, data from the process may be saved to an external device. For example, at the default screen 60 of FIG. 4, the user may select the job settings control button 100 to display the settings control screen 106 of FIG. 5. At the settings control screen 106, the user may select the external memory button 120. Upon such selection, and although not shown, an external save screen may be presented to the user wherein the user may enter a filename for the process data and select a save button to transfer data from the computing apparatus memory to external memory, for example, USB flash drive or any other suitable memory. Once the data is saved, the computing apparatus 46 may present the default screen 60 to the user.

Figure 16:
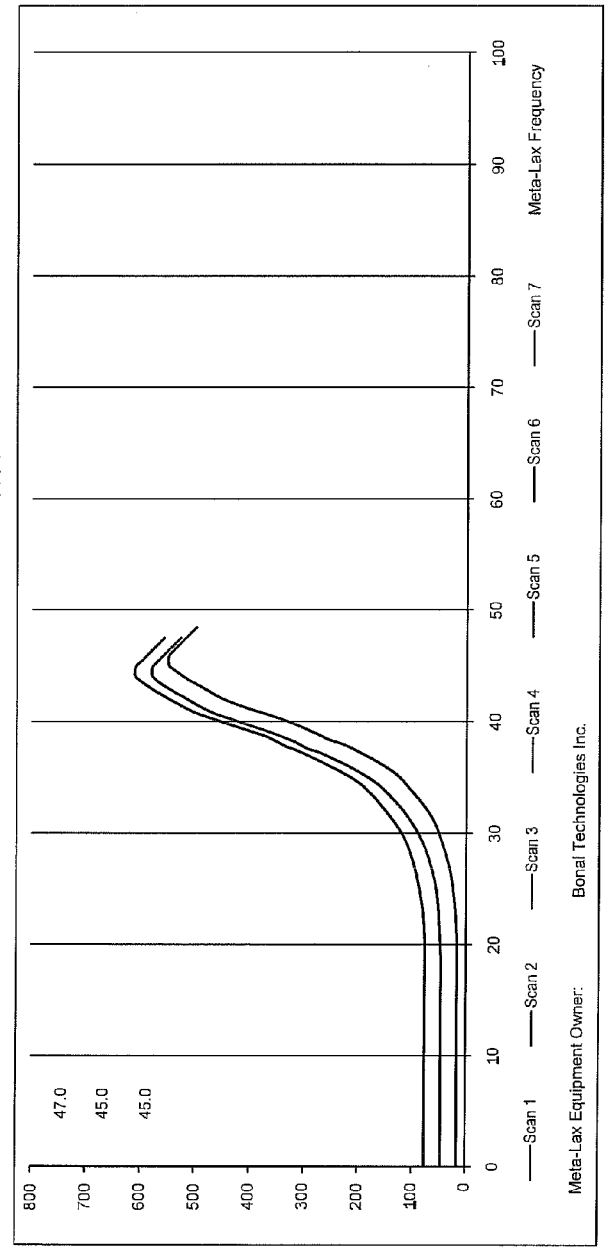
FIG. 16 is an illustration of a vibration treatment certificate that may be output by the apparatus of FIG. 2 and using the method of FIG. 3, in accordance with an exemplary embodiment of the present disclosure.

At step 358, a vibration treatment certificate may be produced. For example, as shown in FIG. 16, the computing apparatus 46 may output to the printer 47 a certificate 174 including the first, second, and subsequent plots, the user or owner or information, and the like.

At step 360, the method may end in any suitable manner.

There thus has been disclosed a method and a graphical user interface for vibration treatment, that at least partially satisfies at least some of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A vibration treatment system, comprising:
vibration treatment equipment including a force inducer and a transducer; and
a computing apparatus to monitor input from the force transducer and control output to the force inducer, and including:
at least one input device to receive data from a user;
at least one output device to present data to the user, and including a graphical user interface that includes:
a vibration amplitude meter including:
an origin,
a range limit oppositely disposed from the origin,
at least one peak amplitude bar representative of a peak amplitude signal and extending from the origin toward the range limit, and
a present amplitude bar representative of a present amplitude signal received from at least one of the transducer or the processor and extending from the origin toward the range limit alongside the at least one peak amplitude bar, wherein the present amplitude bar is graphically coded for an in-range condition and at least one out-of-range condition,
wherein the at least one peak amplitude bar includes two amplitude bars disposed on either side of the present amplitude bar, and wherein the present amplitude bar is color-coded a first color for an in-range condition, color-coded a second color for an above-range condition, and color-coded a third color for a below-range condition, wherein the colors are different,
a memory storing program instructions and data; and
a processor coupled to the input and output devices and memory and responsive to the program instructions for causing the system to perform a method of vibration treatment.

2. The system set forth in claim 1 wherein the first color is green, the second color is red, and the third color is blue.

3. The system set forth in claim 1 wherein the vibration amplitude meter also includes a graphically coded border disposed at least on either side of the present amplitude bar.

4. The system set forth in claim 3 wherein the border is coded for a plurality of amplitude ranges.

5. The system set forth in claim 4 wherein the border is color-coded a first color for a first amplitude range and color-coded a second color for a second amplitude range.

6. The system set forth in claim 1 wherein the interface also includes a frequency section including a plurality of graphical vibration frequency control buttons and a numerical vibration frequency meter.

7. The system set forth in claim 6 wherein the interface also includes a timer section including a numerical chronometer, and a job section including a plurality of graphical job control buttons.

8. The system set forth in claim 7 wherein all of the control buttons are displayed in a default screen and at least one of the control buttons becomes hidden in at least one other screen.

9. A method of vibration treatment of an object comprising the steps of:
  a) providing to a user a graphical user interface including a vibration amplitude meter and a vibration frequency control;
  b) receiving a first scan request from the user via the vibration frequency control;
  c) applying increasing amounts of mechanical vibration to the object in response to receipt of the first scan request;
  d) monitoring frequency and amplitude of the vibration applied to the object in step c);
  e) storing a first frequency corresponding to maximum amplitude from the first scan;
  f) displaying to the user via the vibration amplitude meter of the graphical user interface, an amplitude origin, a range limit oppositely disposed from the origin, at least one peak amplitude bar representative of a peak amplitude signal and extending from the origin toward the range limit, and a present amplitude bar representative of a present amplitude signal and extending from the origin toward the range limit alongside the at least one peak amplitude bar, wherein the present amplitude bar is displayable in an in-range graphical code and in at least one out-of-range graphical code; and
  g) receiving from the user via the vibration frequency control, a vibration setting to fix the frequency of vibration to be applied to the object to a level such that the present amplitude bar displays the in-range graphical code, and if the present amplitude signal changes such that the present amplitude bar displays the at least one out-of-range graphical code, then allowing the user to adjust mechanical vibration applied to the object via the vibration frequency control until the present amplitude bar again displays the in-range graphical code.

10. The method set forth in claim 9 further comprising the steps of:
  h) applying mechanical vibration to the object at the fixed frequency from step g) for a first time;
  i) terminating the application of mechanical vibration upon expiration of the first time;
  j) receiving a second scan request from the user via the vibration frequency control;
  k) applying increasing amounts of mechanical vibration to the object in response to receipt of the second scan request;
  l) monitoring frequency and amplitude of the vibration applied to the object in step k);
  m) storing a second frequency corresponding to maximum amplitude from the second scan; and
  n) receiving from the user via the vibration frequency control, a vibration setting to fix frequency of vibration to be applied to the object to a level such that the present amplitude bar displays the in-range graphical code.

11. The method set forth in claim 10 further comprising the steps of:
  o) applying mechanical vibration to the object at the fixed frequency from step n) for a second time;
  p) terminating the application of mechanical vibration upon expiration of the second time;
  q) receiving a subsequent scan request from the user via the vibration frequency control;
  r) applying increasing amounts of mechanical vibration to the object in response to receipt of the subsequent scan request;
  s) monitoring frequency and amplitude of the vibration applied to the object in step r);
  t) storing a subsequent frequency corresponding to maximum amplitude from the subsequent scan; and
  u) determining that vibration treatment is complete, if a difference between the second and subsequent frequencies is less than a predetermined amount, otherwise repeating steps q) through u).

12. The method set forth in claim 11 further comprising the step of continuing to display the present amplitude bar during steps h) and o).

13. A computer program product including a non-transitory computer-readable medium including instructions executable by a computer processor of a vibration treatment system to cause the vibration treatment system to implement steps of a method according to the following steps:
  a) providing to a user a graphical user interface including a vibration amplitude meter and a vibration frequency control;
  b) receiving a first scan request from the user via the vibration frequency control;
  c) applying increasing amounts of mechanical vibration to the object in response to receipt of the first scan request;
  d) monitoring frequency and amplitude of the vibration applied to the object in step c);
  e) storing a first frequency corresponding to maximum amplitude from the first scan;
  f) displaying to the user via the vibration amplitude meter of the graphical user interface, an amplitude origin, a range limit oppositely disposed from the origin, at least one peak amplitude bar representative of a peak amplitude signal and extending from the origin toward the range limit, and a present amplitude bar representative of a present amplitude signal and extending from the origin toward the range limit alongside the at least one peak amplitude bar, wherein the present amplitude bar is displayable in an in-range graphical code and in at least one out-of-range graphical code; and
  g) receiving from the user via the vibration frequency control, a vibration setting to fix the frequency of vibration to be applied to the object to a level such that the present amplitude bar displays the in-range graphical code, and if the present amplitude signal changes such that the present amplitude bar displays the at least one out-of-range graphical code, then allowing the user to adjust mechanical vibration applied to the object via the vibration frequency control until the present amplitude bar again displays the in-range graphical code.

14. A computer-controlled vibration treatment system, comprising:
  at least one input device to receive data;
  at least one output device to present data;
  a memory storing program instructions and data; and
  a processor coupled to the input and output devices and memory and responsive to the program instructions for causing the computer-controlled system to perform a method according to the following steps:

a) providing to a user a graphical user interface including a vibration amplitude meter and a vibration frequency control;
b) receiving a first scan request from the user via the vibration frequency control;
c) applying increasing amounts of mechanical vibration to the object in response to receipt of the first scan request;
d) monitoring frequency and amplitude of the vibration applied to the object in step c);
e) storing a first frequency corresponding to maximum amplitude from the first scan;
f) displaying to the user via the vibration amplitude meter of the graphical user interface, an amplitude origin, a range limit oppositely disposed from the origin, at least one peak amplitude bar representative of a peak amplitude signal and extending from the origin toward the range limit, and a present amplitude bar representative of a present amplitude signal and extending from the origin toward the range limit alongside the at least one peak amplitude bar, wherein the present amplitude bar is displayable in an in-range graphical code and in at least one out-of-range graphical code; and
g) receiving from the user via the vibration frequency control, a vibration setting to fix the frequency of vibration to be applied to the object to a level such that the present amplitude bar displays the in-range graphical code, and if the present amplitude signal changes such that the present amplitude bar displays the at least one out-of-range graphical code, then allowing the user to adjust mechanical vibration applied to the object via the vibration frequency control until the present amplitude bar again displays the in-range graphical code.

15. A vibration treatment system, comprising:

vibration treatment equipment including a force inducer and a transducer; and
a computing apparatus to monitor input from the force transducer and control output to the force inducer, and including:
at least one input device to receive data from a user;
  at least one output device to present data to the user, and including
  a graphical user interface that includes:
    an amplitude section including a graphical vibration amplitude meter and a numerical vibration amplitude meter, wherein the graphical vibration amplitude meter includes:
      an origin,
      a range limit oppositely disposed from the origin,
      at least one peak amplitude bar representative of a peak amplitude signal and extending from the origin toward the range limit, and
      a present amplitude bar representative of a present amplitude signal received from at least one of the transducer or the processor and extending from the origin toward the range limit alongside the at least one peak amplitude bar, wherein the present amplitude bar is graphically coded for an in-range condition and at least one out-of-range condition,
      wherein the at least one peak amplitude bar includes two amplitude bars disposed on either side of the present amplitude bar, and wherein the present amplitude bar is color-coded a first color for an in-range condition, color-coded a second color for an above-range condition, and color-coded a third color for a below-range condition, wherein the colors are different;
    a frequency section including a numerical vibration frequency meter and a plurality of graphical vibration frequency control buttons, which include at least one of a frequency ramp button or a frequency incremental increase button selectable to initiate treatment;
    a timer section including a numerical chronometer;
    a job section including a plurality of graphical job control buttons, which include at least one of a job done button selectable to save job data, a job data button selectable to review job data, or a job settings button selectable to review and enter job settings;
    wherein all of the control buttons are displayed in a default screen and at least one of the control buttons becomes hidden in at least one other screen including at least one of a scan screen during a scan mode or a vibration treatment screen during a vibration treatment setting mode;
  a memory storing program instructions and data; and
  a processor coupled to the input and output devices and memory and responsive to the program instructions for causing the system to perform a method of vibration treatment.

16. The system set forth in claim 15 wherein at least one of a timer set button, the job done button, or the job settings button are hidden in the scan screen during the scan mode.

17. The system set forth in claim 15 wherein at least one of amplitude buttons, the frequency ramp button, timer buttons, or job buttons are hidden in the vibration treatment setting screen during the vibration treatment setting mode.

18. The system set forth in claim 15 wherein amplitude and frequency control buttons are hidden in the vibration treatment screen during the vibration treatment mode.

* * * * *